Feb. 13, 1923.
J. F. WHITE
PROTECTOR STRIP
Filed Feb. 11, 1922
1,444,994
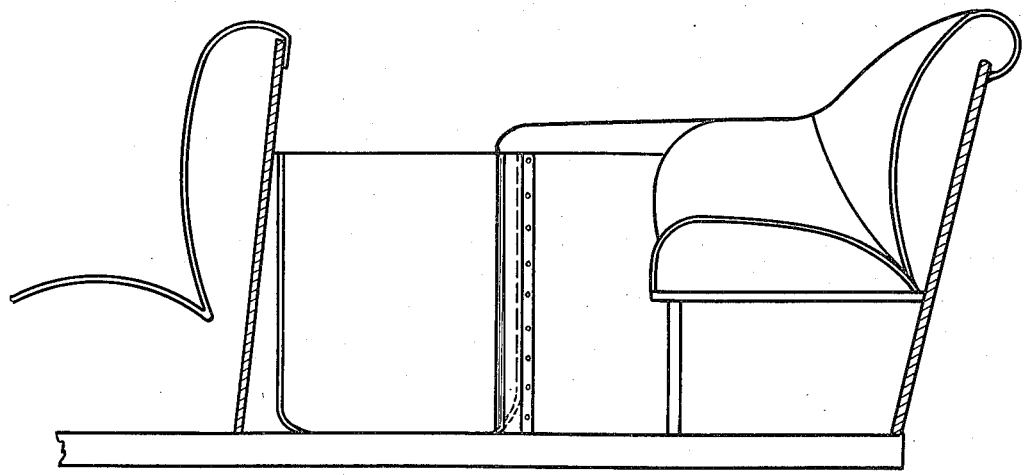
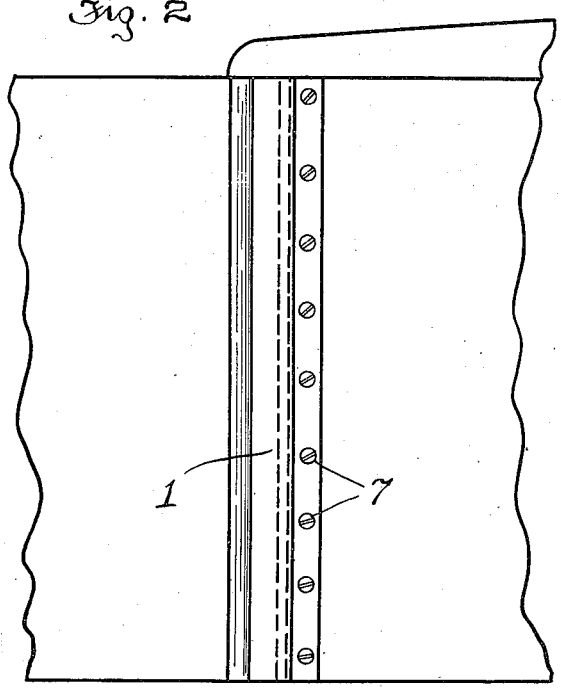
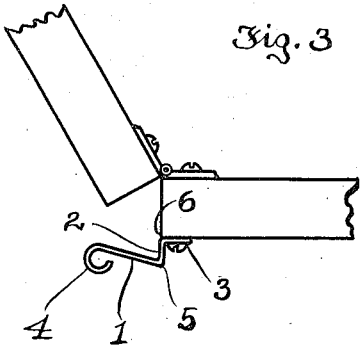
Inventor
John F. White Patented Feb. 13, 1923.

1,444,994

UNITED STATES PATENT OFFICE.

JOHN FRANKLIN WHITE, OF OAKLAND, CALIFORNIA.

PROTECTOR STRIP.

Application filed February 11, 1922. Serial No. 535,898.

*To all whom it may concern:*

Be it known that I, JOHN FRANKLIN WHITE, a citizen of the United States, residing at Oakland, in the county of Alameda and State of California, have invented certain new and useful Improvements in Protector Strips, of which the following is a specification.

My invention is a protector strip which is placed on the inside of an automobile body at the hinged edges of the automobile doors to prevent the occupants of the automobile from mashing their fingers between said edges of the doors and the automobile body when the doors are closed.

Referring to the drawing forming part of this specification:

Figure 1 is a fragmentary longitudinal section of an automobile body with my protector strip secured to the inside of the automobile body over the hinged edge of the door.

Figure 2 is an enlarged view similar to Figure 1.
Figure 3 is a fragmentary plan view of an automobile body with my strip secured to the inside of the body over the hinged edge of the door with the door open.

My protector strip is made of a single strip of sheet metal and comprises a body 1, an offset member 2, a flange 3, at one side edge and a bead 4 at the other side edge. The strip is bent at an acute angle at 5 to form the body 1 and offset member 2. The strip is bent at 6 at right angles to form the flange 3. The bead 4 is formed by curling the free edge of the strip inwardly.

The strip is secured in position by the flange 3 which is secured by screws 7 to the inside of the automobile body at the hinged edge of the door opening. The offset member 2 offsets the body 1 of the strip inwardly so that the strip does not touch the door when closed, but the body 1 extends at an angle from the connecting member 2 towards the door so that the beaded free edge of the strip rests close to the door with the bead 4 out of the way when closed at a short distance forwardly of the hinged edge of the door.

Having described my invention, I claim:

1. A protector strip comprising a single strip of sheet metal bent to form a body member, an offset member, a flange at one edge and a bead at the other edge, which flange is secured to the inside of the automobile body over the hinged edge of the door.

2. A protector strip comprising a single strip of sheet metal bent to form a body member, an offset member, a flange at one edge and a bead at the other edge, which flange is secured to the inside of the automobile body over the hinged edge of the door, the strip being bent at an acute angle to form said offset member and said body member which extends towards the door, and the bead being curled inwardly.

In testimony whereof I affix my signature.

JOHN FRANKLIN WHITE.